US008796882B2

(12) United States Patent
Garcia et al.

(10) Patent No.: US 8,796,882 B2
(45) Date of Patent: Aug. 5, 2014

(54) SYSTEM AND METHOD FOR SUPPLYING POWER ON DEMAND TO A DYNAMIC LOAD

(75) Inventors: Jorge A. Garcia, San Diego, CA (US); Ramkumar Sivakumar, Woburn, MA (US)

(73) Assignee: QUALCOMM Incorporated, San Diego, CA (US)

( * ) Notice: Subject to any disclaimer, the term of this patent is extended or adjusted under 35 U.S.C. 154(b) by 566 days.

(21) Appl. No.: 12/484,718

(22) Filed: Jun. 15, 2009

(65) Prior Publication Data

US 2010/0308661 A1 Dec. 9, 2010

Related U.S. Application Data

(60) Provisional application No. 61/184,276, filed on Jun. 4, 2009.

(51) Int. Cl.
*H02J 1/00* (2006.01)

(52) U.S. Cl.
USPC .......................................................... 307/80

(58) Field of Classification Search
USPC .......................................................... 307/80
See application file for complete search history.

(56) References Cited

U.S. PATENT DOCUMENTS

| | | | |
|---|---|---|---|
| 3,626,686 A | 12/1971 | Harris John E | |
| 5,113,428 A | 5/1992 | Fitzgerald | |
| 5,552,643 A | 9/1996 | Morgan et al. | |
| 6,034,483 A * | 3/2000 | Frus et al. | 315/209 CD |
| 6,144,115 A | 11/2000 | Massie et al. | |
| 6,459,171 B1 | 10/2002 | Leifer | |
| 7,638,899 B2 * | 12/2009 | Tracy et al. | 307/65 |
| 7,813,148 B2 * | 10/2010 | Zeng et al. | 363/17 |
| 2002/0016188 A1 | 2/2002 | Kashiwamura | |
| 2004/0196019 A1 | 10/2004 | Schneider | |
| 2006/0092774 A1 * | 5/2006 | Ichikawa et al. | 369/30.25 |
| 2007/0098044 A1 * | 5/2007 | Kim et al. | 375/130 |
| 2009/0152953 A1 * | 6/2009 | Dong et al. | 307/80 |

FOREIGN PATENT DOCUMENTS

| | | |
|---|---|---|
| DE | 202004004564 U1 | 6/2004 |
| DE | 102007017632 A1 | 10/2008 |
| EP | 0184606 A2 | 6/1986 |
| EP | 1310959 A1 | 5/2003 |
| FR | 2909756 A1 | 6/2008 |
| TW | M282423 U | 12/2005 |

(Continued)

OTHER PUBLICATIONS

Taiwan Search Report—TW099118211—TIPO—Nov. 15, 2013.

(Continued)

*Primary Examiner* — Rexford Barnie
*Assistant Examiner* — Dru Parries
(74) *Attorney, Agent, or Firm* — Paul S. Holdaway

(57) ABSTRACT

An apparatus for supplying power to a load. The apparatus including a plurality of sources to provide charge, and a controller adapted to control a transfer of charge from the sources to the load at distinct times. The controller may control the transfer of charge based on variation of an ambient condition or a manufacturing process. The controller may control the transfer of charge to generate a defined voltage across the load. The apparatus may include a regulator adapted to regulate a voltage across the load. The regulator may regulate the voltage across the load in a defined timing relationship with the transfer of charge from the sources to the load.

38 Claims, 8 Drawing Sheets

(56) References Cited

FOREIGN PATENT DOCUMENTS

| TW | I253225 B | 4/2006 |
|---|---|---|
| TW | 200814522 A | 3/2008 |
| TW | I297237 B | 5/2008 |
| TW | 200919960 A | 5/2009 |

OTHER PUBLICATIONS

International Search Report and Written Opinion -PCT/US2010/037510—International Search Authority, European Patent Office, Jan. 26, 2011.

* cited by examiner

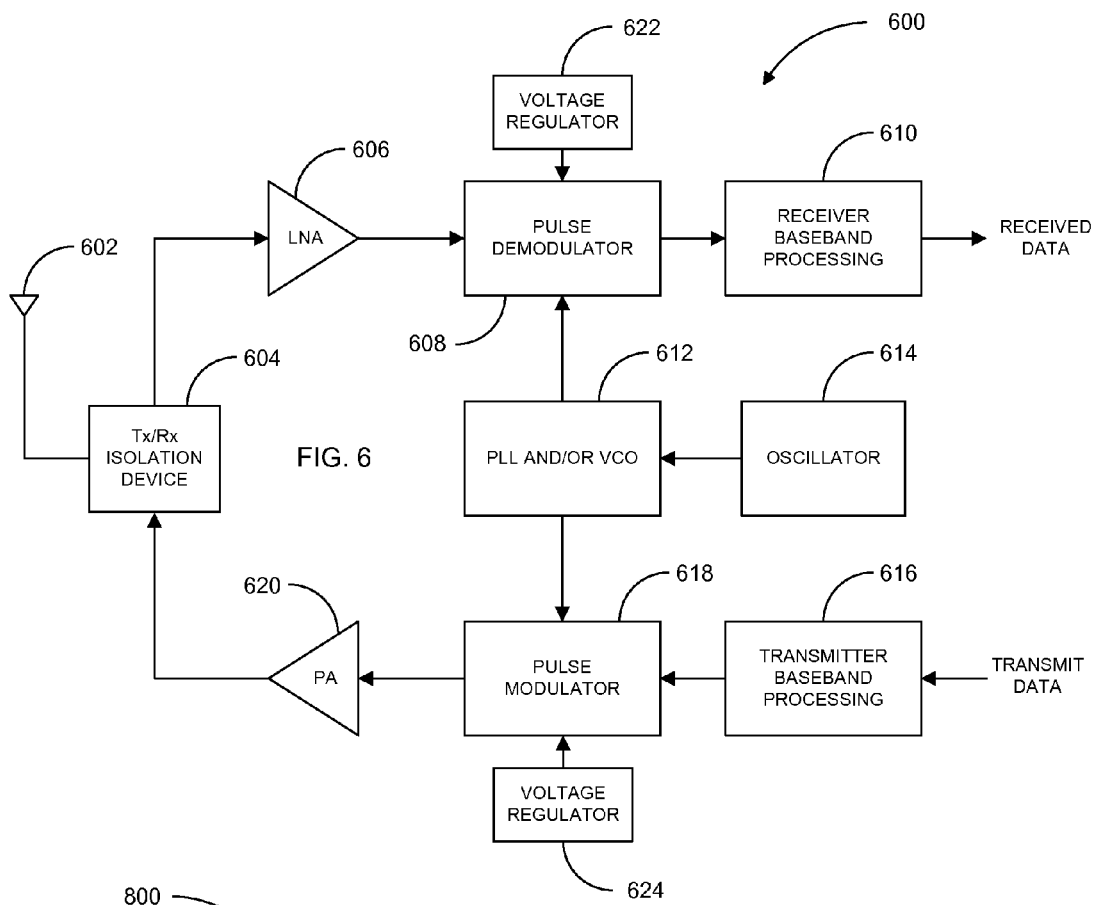
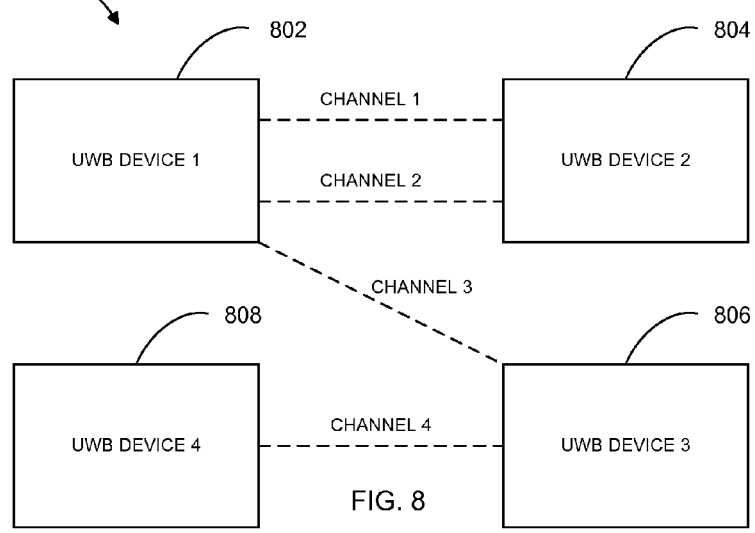

SYSTEM AND METHOD FOR SUPPLYING POWER ON DEMAND TO A DYNAMIC LOAD

CROSS-REFERENCE TO A RELATED APPLICATION

This application claims the benefit of the filing date of Provisional Application Ser. No. 61/184,276, filed on Jun. 4, 2009, and entitled "System and Method for Supplying Power on Demand to a Dynamic Load," which is incorporated herein by reference.

FIELD

The present disclosure relates generally to power supplying systems, and more specifically, to a system and method for supplying power to a highly-dynamic or bursty load.

BACKGROUND

The bursty nature of highly dynamic loads causes current demands on a power regulator to go, for example, from a few micro Amps (µA) to tens of milli Amps (mA) within a short period of time (e.g., in the order of 3 nanoseconds (ns) for the case of an ultra wideband (UWB) application). Moreover, the power regulator has to recover from the initial burst and be ready for the next burst within a very short period (e.g., 10-20 ns for a pulse position UWB system). Along with this rapidly changing load requirement, there are load regulation specifications that typically restrict the maximum voltage ripple across the load to values below a few tens of milli Volts (mV).

The dynamic requirements typically associated with bursty load operations generally preclude the use of conventional voltage regulation schemes, such as Low Drop Out (LDO) regulators or Switch-Mode Power Supplies (SMPS) which, due to their inherent feedback regulation schemes and relatively low bandwidth, typically cannot react fast enough to the rapid changes of the load profile. As a consequence, one of the regulation aspects is invariably compromised: the ripple voltage, the regulation capabilities, or the regulation capacitance size, which may become undesirably large.

The current solutions to tackle this type of requirements are generally ineffective in solving the problem. For example, the use of an LDO regulator for regulation of such a bursty supply would be difficult for the reason that the loop is not fast enough to regulate the supply within a very short time period (e.g., 12.5 ns). Furthermore, the stringent requirements on the maximum droop tolerated generally requires a huge bypass capacitor. Moreover, the loop bandwidth of the LDO is limited by the stability requirement and an LDO with a few ns response is difficult to realize.

SUMMARY

An aspect of the disclosure relates to an apparatus for supplying power to a load. The apparatus comprises a plurality of sources to provide charge, and a controller adapted to control a transfer of charge from the sources to the load at distinct times. In another aspect, the controller is adapted to control the transfer of charge based on variation of an ambient condition or a manufacturing process. In yet another aspect, the controller is adapted to control the transfer of charge to generate a defined voltage across the load. In still another aspect, the defined voltage comprises a substantially sinewave voltage, a substantially square wave voltage, a substantially staircase voltage or a defined pulse.

In another aspect of the disclosure, the controller is adapted to control the transfer of charge to generate a defined voltage ripple across the load. In another aspect, the controller is adapted to control the transfer of charge to maintain a voltage across the load at or above a defined voltage. In yet another aspect, the apparatus further comprises a regulator adapted to regulate a voltage across the load. In still another aspect, the regulator comprises a Buck converter or a switched capacitor converter. In even still another aspect, the regulator is adapted to regulate the voltage across the load in a defined timing relationship with the transfer of charge from the sources to the load.

In another aspect of the disclosure, the at least one of the charge sources comprises a capacitor-based feed forward network, a voltage boosted capacitor feed forward network, a switched inductor feed forward network, or a bypass capacitor feed forward network. In another aspect, the amount of charge transferred respectively by two or more charge sources are distinct. In yet another aspect, the amounts of charge transferred respectively by two or more charge sources are substantially the same. In still another aspect, the voltages generated respectively in the charge sources are greater than a voltage across the load.

Other aspects, advantages and novel features of the present disclosure will become apparent from the following detailed description of the disclosure when considered in conjunction with the accompanying drawings.

BRIEF DESCRIPTION OF THE DRAWINGS

FIG. 6 illustrates a block diagram of an exemplary communication system in accordance with another aspect of the disclosure.

FIG. 8 illustrates a block diagram of various communications devices communicating with each other via various channels in accordance with another aspect of the disclosure.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Figure 1A:
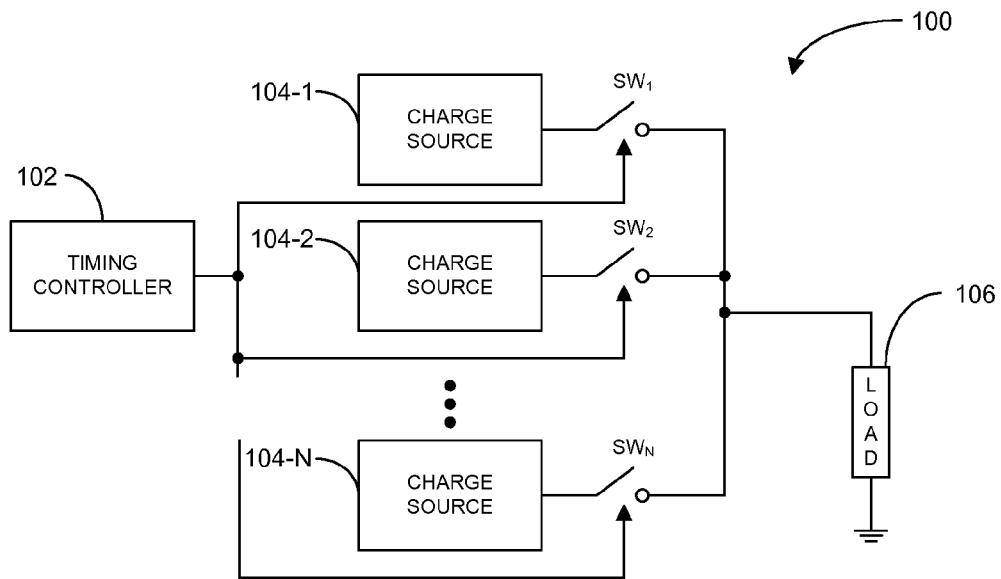
FIG. 1A illustrates a block diagram of an exemplary apparatus for supplying power to a load in accordance with an aspect of the disclosure.

FIG. 1A illustrates a block diagram of an exemplary apparatus 100 for supplying power to a load 106 in accordance with an aspect of the disclosure. In summary, the apparatus 100 comprises a plurality of sources to provide charge to a load at distinct times as governed by a timing controller. The apparatus 100 may provide charge to the load 106 as needed, for example, to maintain the voltage across the load within a defined range in response to different current demands required by the load.

In particular, the apparatus 100 comprises a timing controller 102, a plurality of charge sources 104-1 to 104-N, and a plurality of switching elements $SW_1$ to $SW_N$. Each charge source (104-1 to 104-N) is adapted to hold or store charge for delivery to the load 106 when the corresponding switching element ($SW_1$ to $SW_N$) is turned ON or closed. The timing controller 102 controls the opening and closing of the switching elements $SW_1$ to $SW_N$ in order to deliver charge to the load 106, when needed or demanded by the load. The amount of charge delivered by the charge sources 104-1 to 104-N may all be substantially the same, or at least one or more may deliver different amounts of charge. The following describes an exemplary application of the apparatus 100 with regard to a bursty or highly dynamic load.

Figure 1B:
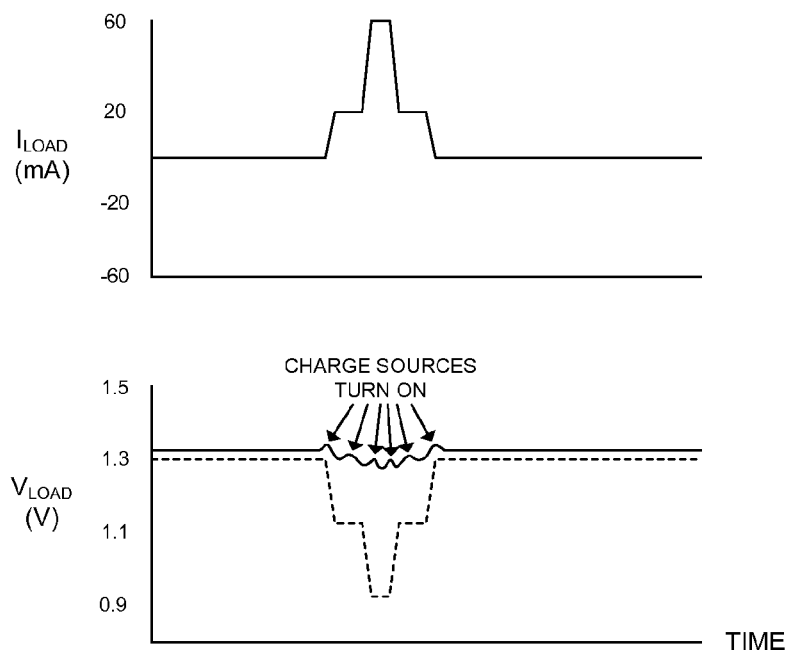
FIG. 1B illustrates a timing diagram of exemplary load current and voltage in accordance with another aspect of the disclosure.

FIG. 1B illustrates a timing diagram of exemplary load current and voltage in accordance with another aspect of the disclosure. The upper diagram illustrates the load current as a function of time for the bursty or highly dynamic load. The lower diagram illustrates the voltage across the load as a function of time. The lower diagram illustrates two responses: the first response, indicated as a dashed line, is the voltage response across the load for an uncompensated power supply; and the second response, indicated as a solid line, is the voltage response across the load for the apparatus 100.

As illustrated, when the load current begins to increase, the voltage across the load for the uncompensated power supply begins to decreases. The decrease in voltage is due to the voltage drop across an internal and/or external resistive element in the uncompensated power supply. Accordingly, the load voltage response for the uncompensated power supply is essentially the opposite or mirror-image response of the load current response. Thus, the uncompensated voltage across the load has a ripple, for example, of almost 0.4 Volt, which may be unacceptable for certain applications.

In contrast, the apparatus 100 selectively provides charge to the load 106 in order to maintain the voltage across the load within a defined range or ripple. For example, just prior to the load current increasing, the timing controller 102 closes or turns ON the switching element SW1. This delivers a bundle of charge from the charge source 104-1 to the load 106. As noted in the diagram, the voltage across the load 106 exhibits a first bump or increase. As the load 106 demands more current, the load voltage then decreases. Prior to the load voltage decreasing below a defined level, the timing controller 102 closes or turns ON the switching element SW2. This delivers another bundle of charge from the charge source 104-2 to the load 106. Similarly, the voltage across the load 106 exhibits a second bump or increase. The timing controller 102 continues to selectively close the switching elements $SW_3$ to $SW_N$ in order to provide charge on demand or as needed from the charge sources 104-3 to 104-N in order to maintain the voltage across the load 106 within a defined range or ripple, as illustrated in the diagram.

Figure 1C:
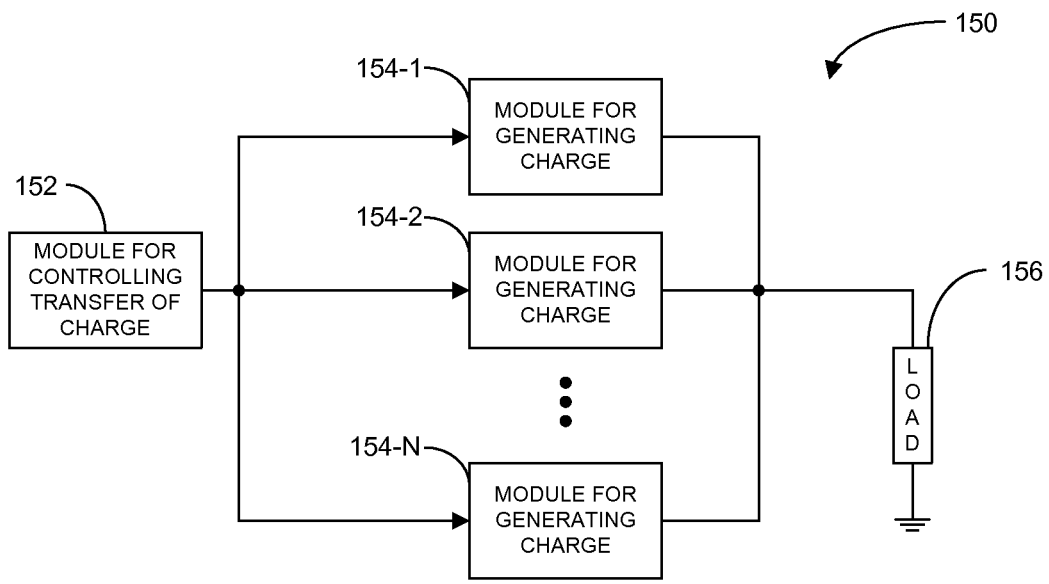
FIG. 1C illustrates a block diagram of another exemplary apparatus for supplying power to a load in accordance with another aspect of the disclosure.

FIG. 1C illustrates a block diagram of another exemplary apparatus 150 for supplying power to a load 156 in accordance with another aspect of the disclosure. In general, the apparatus 150 comprises a plurality of modules 154-1 to 154-N for generating charge, and a module 152 for controlling the transfer of charge from the modules 154-1 to 154-N to the load 156 at distinct times. This may be done to maintain the voltage across the load 156 within a defined range or ripple. Alternatively, or in addition to, this may be done to regulate the load voltage in response to variation of an ambient condition or a manufacturing process. Alternatively, or in addition to, this may also be done to synthesize a defined voltage pattern or response across the load 156. For example, the voltage pattern or response may include a substantially sinewave, a substantially square wave, a substantially staircase, or a defined pulse. The aforementioned list of alternative patterns or responses, as used herein, shall further include any combination thereof.

Figure 2:
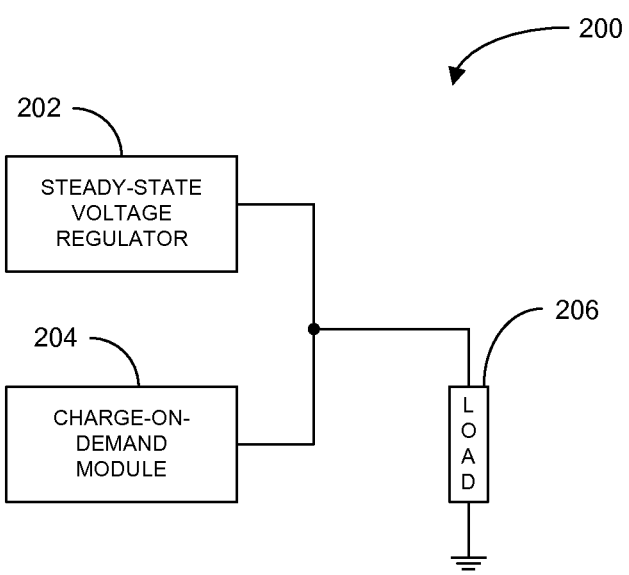
FIG. 2 illustrates a block diagram of another exemplary apparatus for supplying power to a load in accordance with another aspect of the disclosure.

FIG. 2 illustrates a block diagram of another exemplary apparatus 200 for supplying power to a load 206 in accordance with another aspect of the disclosure. The apparatus 200 comprises a steady-state voltage regulator 202 and a charge-on-demand module 204. The steady-state voltage regulator 202 performs the long term or continuous regulation of the voltage across the load 206. The charge-on-demand module 204 supplies charge to the load 206 when needed based on the load requirements, such as, for example, when the load 206 needs lots of current within a short period of time. A defined timing relationship may exist between the regulation of the voltage provided by the voltage regulator 202 and the supplying of charge by the charge-on-demand module 204 in order to meet the current demands and voltage regulation of the load.

The voltage regulator 202 may be any type of voltage regulator, such as a switched capacitor converter or a Buck converter. The aforementioned list of alternative regulators, as used herein, shall further include any combination thereof. Additionally, the charge-on-demand module 204 may include a capacitor-based feed forward network, a voltage boosted capacitor feed forward network, a switched inductor feed forward network, or a bypass capacitor feed forward network. The aforementioned list of alternative charge-on-demand modules, as used herein, shall further include any combination thereof. The following describes several exemplary implementations of the apparatus 200.

Figure 3:
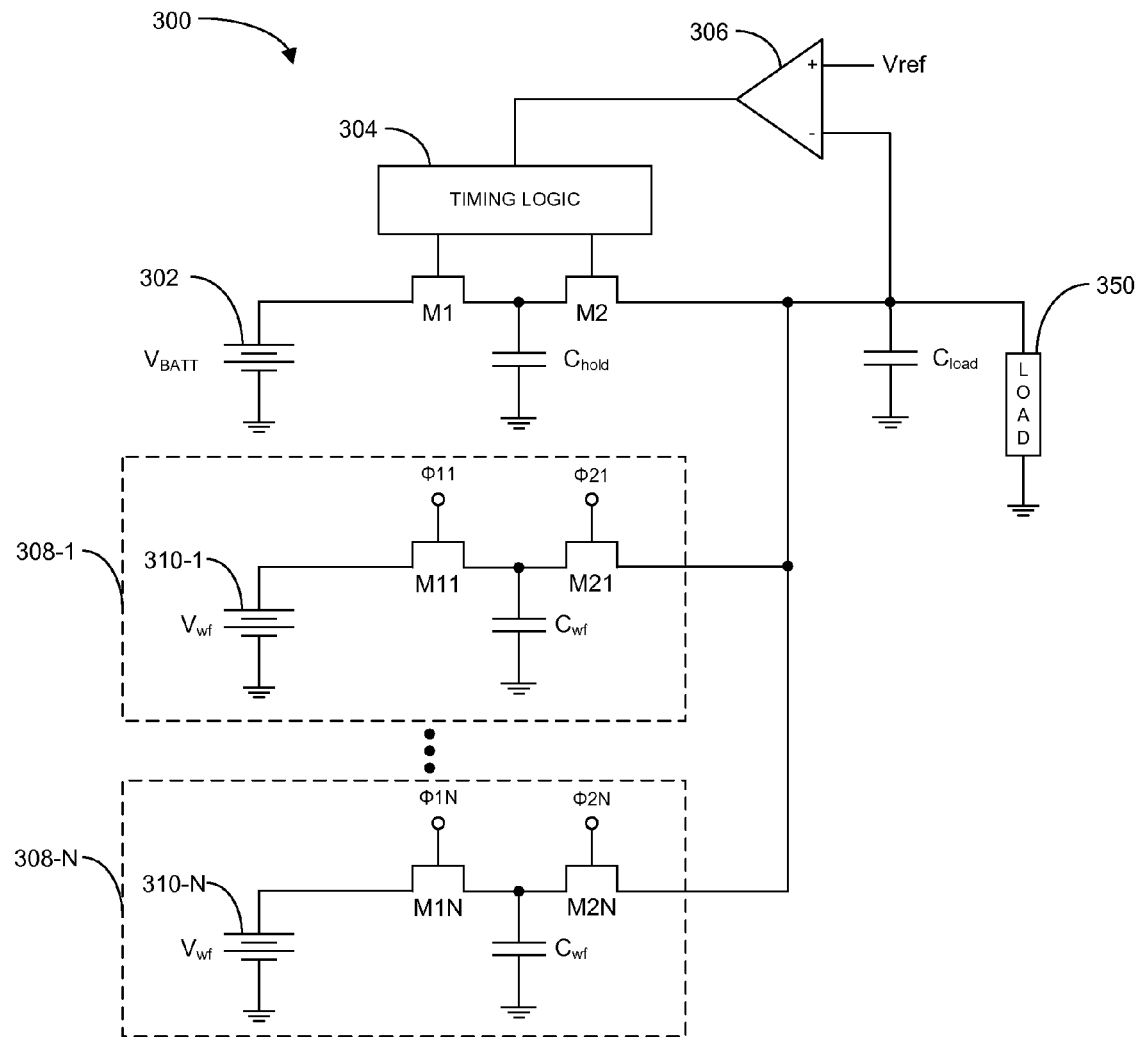
FIG. 3 illustrates a schematic diagram of another exemplary apparatus for supplying power to a load in accordance with another aspect of the disclosure.

FIG. 3 illustrates a schematic diagram of another exemplary apparatus 300 for supplying power to a load 350 in accordance with another aspect of the disclosure. In summary, the apparatus 300 includes a switched capacitor converter to perform the long term or continuous regulation of the voltage across the load 350. Additionally, the apparatus 300 further comprises a plurality of sources of charge for delivery to the load 350 when needed based on the load requirements.

In particular, the apparatus 300 comprises a switched capacitor converter including a voltage source 302 (e.g., a battery), a pair of switching elements M1 and M2 (e.g., metal oxide semiconductor field effect transistors (MOSFETs)), a pair of capacitive elements $C_{hold}$ and $C_{load}$, a timing logic 304, and a differential amplifier 306. The voltage source 302 is coupled between a first end of the first switching element M1 and ground. The second end of the first switching element M1 is coupled to a first end of the second switching element M2. The first capacitive element $C_{hold}$ is coupled between the second end of the first switching element M1 and ground. The second end of the second switching element M2 is coupled to the negative input of the differential amplifier 306. The second capacitive element $C_{load}$ and the load 350 are respectively coupled between the negative input of differential amplifier 306 and ground. The positive input of the differential amplifier 306 is adapted to receive a reference voltage Vref. The output of the differential amplifier 306 is coupled to an input of the timing logic 304. The timing logic 304 includes a pair of outputs respectively coupled to the control inputs (e.g., gates) of the first and second switching elements M1 and M2.

The switched capacitor converter operates to provide long term or continuously regulation of the voltage across the load 350. It performs this by the timing logic 304 controlling the switching elements M1 and M2 in response to a difference in voltage between the load voltage and the reference voltage Vref. For example, if the load voltage is below the reference voltage Vref, the timing logic 304 operates the switching elements M1 and M2 in a relatively fast alternating manner to increase the rate of charge delivered to the load 350 so as to increase the load voltage. Conversely, if the load voltage is above the reference voltage Vref, the timing logic 304 operates the switching elements M1 and M2 in a relatively slow alternating manner to decrease the rate of charge delivered to the load 350 so as to decrease the load voltage.

The turning ON of the first switching element M1 couples the battery 302 to the first capacitive element $C_{hold}$ in order to form charge on the capacitive element $C_{hold}$. The turning ON of the second switching element M2 couples the first capacitive element $C_{hold}$ to the load 350 in order to transfer or deliver the charge to the load. The second capacitive element $C_{load}$ helps with maintaining the load voltage within the defined range or ripple. The reference voltage Vref is used to set the output voltage within the defined range.

Additionally, the apparatus 300 further comprises a plurality of charge sources 308-1 to 308-N for providing charge to the load 350, when the load demands charge at a rate higher than the rate in which the switched capacitor converter can provide the charge. This may be the situation for a bursty or highly dynamic load. Each of the charge sources 308-1 to 308-N may be configured the same, or at least one or more differently. In this example, the charge sources 308-1 to 308-N are configured the same.

The charge sources 308-1 to 308-N respectively comprise voltage sources 310-1 to 310-N (e.g., a battery), first switching elements M11 to M1N, capacitive elements $C_{wf}$ and second switching elements M21 to M2N. In response to respective first phases φ11 to φ21 of a control signal, the first switching elements M11 to M1N turn ON to couple the corresponding batteries 310-1 to 310-N to the capacitive elements $C_{wf}$ in order to form charge on the capacitive elements $C_{wf}$. In response to respective second phases φ1N to φ2N of the control signal, the second switching elements M21 to M2N turn ON to couple the capacitive elements $C_{wf}$ to the load 350 in order to transfer or deliver the charge to the load.

The plurality of charge sources 308-1 to 308-N may be operated to provide charge to the load 350 at distinct times, respectively, in order to meet the load requirements or achieve a defined voltage across the load.

Figure 4:
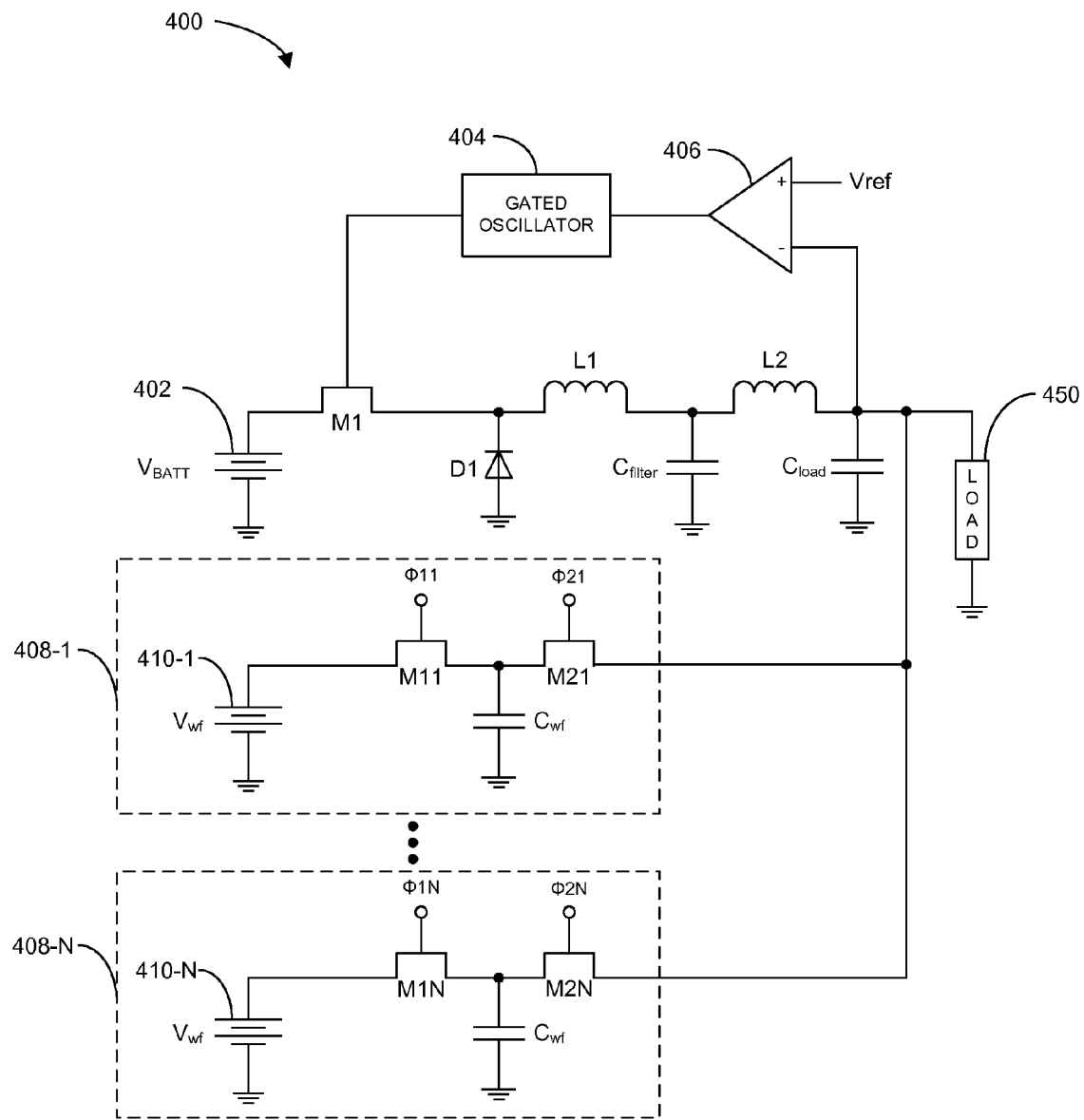
FIG. 4 illustrates a schematic diagram of another exemplary apparatus for supplying power to a load in accordance with another aspect of the disclosure.

FIG. 4 illustrates a schematic diagram of another exemplary apparatus 400 for supplying power to a load 450 in accordance with another aspect of the disclosure. In summary, the apparatus 400 is similar to apparatus 300, except that it includes a Buck converter, instead of a switched capacitor converter, to perform the long term or continuous regulation of the voltage across the load 450. However, similar to the apparatus 300, the apparatus 400 also comprises a plurality of sources of charge for delivery to the load 450, when needed based on the load requirements.

In particular, the apparatus 400 comprises a Buck converter including a voltage source 402 (e.g., a battery), a switching element M1 (e.g., a MOSFET), a diode D1, first and second inductive elements L1 and L2, first and second capacitive elements $C_{filter}$ and $C_{load}$, a gated oscillator 404, and a differential amplifier 406. The voltage source 402 is coupled between a first end of the switching element M1 and ground. The second end of the switching element M1 is coupled to a first end of the first inductive element L1. The cathode of the diode D1 is coupled to the second end of the switching element M1, and the anode of the diode D1 is coupled to ground. The second end of the first inductive element L1 is coupled to a first end of the second inductive element L2. The first capacitive element $C_{filter}$ is coupled between the second end of the first inductive element L1 and ground. The second end of the second inductive element L2 is coupled to the negative input of the differential amplifier 406. The second capacitive element $C_{load}$ and the load 450 are respectively coupled between the negative input of differential amplifier 406 and ground. The positive input of the differential amplifier 406 is adapted to receive a reference voltage Vref. The output of the differential amplifier 306 is coupled to an input of the gated oscillator 404. The gated oscillator 404 includes an output coupled to the control input (e.g., gate) of the switching element M1.

The Buck converter operates to provide long term or continuously regulation of the voltage across the load 450. It performs this by the gated oscillator 404 controlling the switching element M1 in response to the difference in voltage between the load voltage and the reference voltage Vref. For example, if the load voltage is below the reference voltage Vref, the gated oscillator 404 increases the frequency or pulse width of the oscillating signal applied to the control input (e.g., gate) of the switching element M1 to increase the rate of charge delivered to the load 450 so as to increase the load voltage. Conversely, if the load voltage is below the reference voltage Vref, the gated oscillator 404 decreases the frequency or pulse width of the oscillating signal applied to the control input (e.g., gate) of the switching element M1 to decrease the rate of charge delivered to the load 450 so as to decrease the load voltage.

Similar to apparatus 300, the apparatus 400 further comprises a plurality of charge sources 408-1 to 408-N for providing charge to the load 450, when the load demands charge at a rate higher than the rate in which the Buck converter can provide the charge. This may be the situation for a bursty or highly dynamic load. Each of the charge sources 408-1 to 408-N may be configured the same, or at least one or more differently. In this example, the charge sources 408-1 to 408-N are configured the same as that of charge sources 308-1 to 308-N. That is, each charge source (408-1 to 408-N) comprises a voltage source $V_{wf}$ (410-1 to 410-N) (e.g., a battery), a first switching element (M11 to M1N), a capacitive element $C_{wf}$, and a second switching element (M21 to M2N). The operation of the charge sources 408-1 to 408-N has already been discussed with reference to charge sources 308-1 to 308-N.

Figure 5A:
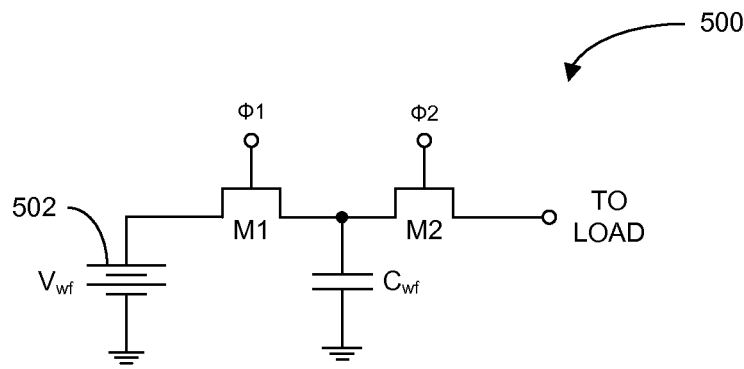
FIG. 5A illustrates a schematic diagram of another exemplary apparatus for supplying power to a load in accordance with another aspect of the disclosure.

FIG. 5A illustrates a schematic diagram of another exemplary apparatus 500 for supplying power to a load in accordance with another aspect of the disclosure. The apparatus 500 is an example of a charge-on-demand source, which, in this case, is configured as a capacitor-based feed forward network. The apparatus 500 comprises a voltage source $V_{wf}$ 502 (e.g., a battery), a first switching element M1 (e.g., a MOSFET), a capacitive element $C_{wf}$, and a second switching element M2 (e.g., a MOSFET). The voltage source 502 is coupled between a first end of the first switching element M1 and ground. The second end of the first switching element M1 is coupled to the first end of the second switching element M2. The capacitive element $C_{wf}$ is coupled between the second end of the first capacitive element M1 and ground. The second end of the second capacitive element M2 couples to the load.

In operation, at a first phase φ1 of a control signal, the first switching element M1 is turned ON to apply the voltage $V_{wf}$ generated by the voltage source 502 across the capacitive element $C_{wf}$. This forms charge on the capacitor. Then, at a second phase φ2 of the control signal, the second switching element M2 is turned ON in order to deliver the charge formed on the capacitive element $C_{wf}$ to the load. The phase difference between first and second phases φ1 and φ2 may be substantially 180 degrees, or some other phase difference. The apparatus 500 may be operated to run any number of charge supply cycles in order to meet the current demand of the load.

Figure 5B:
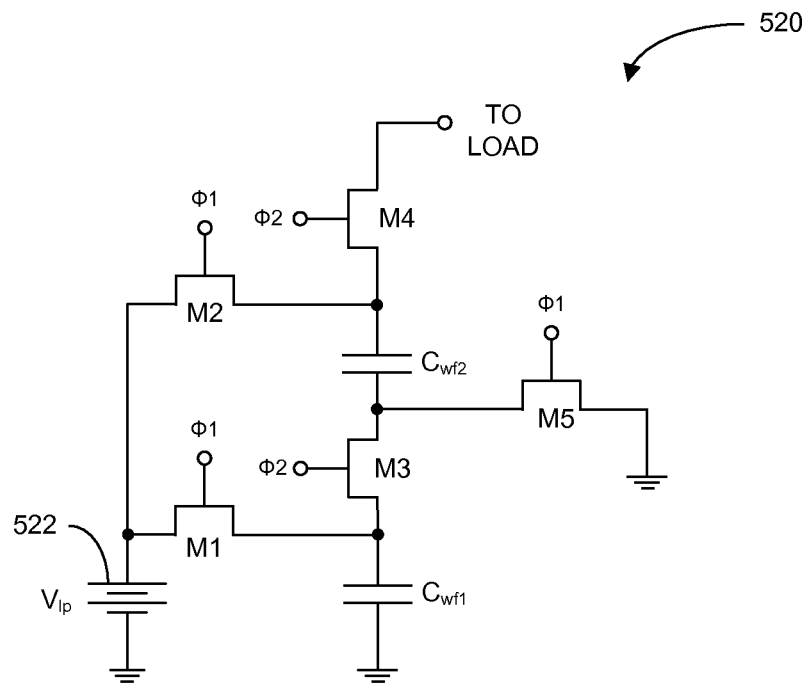
FIG. 5B illustrates a schematic diagram of another exemplary apparatus for supplying power to a load in accordance with another aspect of the disclosure.

FIG. 5B illustrates a schematic diagram of another exemplary apparatus 520 for supplying power to a load in accordance with another aspect of the disclosure. The apparatus 520 is another example of a charge-on-demand source, which, in this case, is configured as a voltage boosted capacitor feed forward network. The apparatus 520 comprises a voltage source $V_{1p}$ 522, five (5) switching elements M1-M5 (e.g., MOSFETs), and a pair of capacitive elements $C_{wf1}$ and $C_{wf2}$.

The voltage source 522 is coupled between respective first ends of switching elements M1 and M2, and ground. The first capacitive element $C_{wf1}$ is coupled between the second end of the first switching element M1 and ground. The second capacitive element $C_{wf2}$ and the switching element M3 are coupled in series between respective second ends of switching elements M1 and M2. The switching element M4 is coupled between the second end of switching element M2 and the load. The switching element M5 is coupled between the node between capacitive element $C_{wf2}$ and switching element M3 and ground.

In operation, at a first phase φ1 of a control signal, the switching elements M1, M2, and M3 are turned ON. The turning ON of switching element M5 electrically couples a first end of the capacitive element $C_{wf2}$ to ground. The turning ON of switching elements M1 and M2 couples the voltage source 522 respectively across capacitive elements $C_{wf1}$ and $C_{wf2}$. This causes charge to form on both capacitive elements $C_{wf1}$ and $C_{wf2}$ each at a voltage of substantially $V_{1p}$. At a second phase φ2 of the control signal, the switching elements M3 and M4 are turned on. This couples both capacitive elements $C_{wf1}$ and $C_{wf2}$ in series to provide charge to the load at a voltage substantially equal to $2*V_{1p}$.

This implementation may be useful to provide charge to the load at a voltage higher than the load voltage. Additionally, this implementation may also be useful to supply charge to the load at a voltage higher than the available supply voltage. The higher voltage of the voltage boosted capacitor feed forward network may cause a preferential current flow from the network to the load, rather than drawing current from the load capacitor. This helps prevent the load voltage from drooping. The phase difference between first and second phases φ1 and φ2 may be substantially 180 degrees, or some other phase difference. The apparatus 520 may be operated to run any number of charge supply cycles in order to meet the current demand of the load.

Figure 5C:
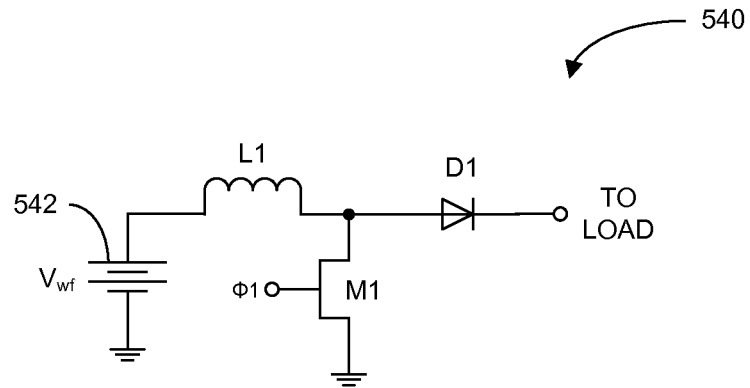
FIG. 5C illustrates a schematic diagram of another exemplary apparatus for supplying power to a load in accordance with another aspect of the disclosure.

FIG. 5C illustrates a schematic diagram of another exemplary apparatus 540 for supplying power to a load in accordance with another aspect of the disclosure. The apparatus 540 is another example of a charge-on-demand source, which, in this case, is configured as a switched inductor feed forward network. The apparatus 540 comprises a voltage source $V_{wf}$ 542 (e.g., a battery), an inductive element L1, a switching element M1 (e.g., a MOSFET), and a diode D1. The voltage source 542 is coupled between a first end of the inductive element L1 and ground. The second end of the inductive element L1 is coupled to the anode of the diode D1. The switching element M1 is coupled between the anode of the diode D1 and ground. The cathode of the diode D1 couples to the load.

In operation, at a phase φ1 of a control signal, the switching element M1 is turned ON to substantially ground the second end of the inductive element L1. This allows a current to flow through the inductive element L1, thereby allowing the inductive element to store the energy. Then, at another phase of the control signal, the switching element M1 is turned OFF in order to deliver stored energy in the inductive element L1 in the form of charge to the load. The apparatus 540 may be operated to run any number of charge supply cycles in order to meet the current demand of the load.

Figure 5D:
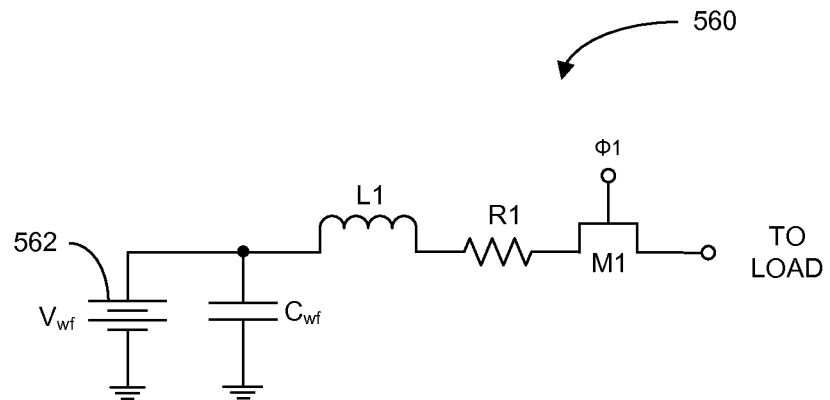
FIG. 5D illustrates a schematic diagram of another exemplary apparatus for supplying power to a load in accordance with another aspect of the disclosure.

FIG. 5D illustrates a schematic diagram of another exemplary apparatus 560 for supplying power to a load in accordance with another aspect of the disclosure. The apparatus 560 is another example of a charge-on-demand source, which, in this case, is configured as a bypass capacitor feed forward network. The apparatus 560 comprises a voltage source $V_{wf}$ 562 (e.g., a battery), a capacitive element $C_{wf}$, an inductive element L1, a resistive element R1, and a switching element M1. The voltage source 562 is coupled in parallel with the capacitive element $C_{wf}$ between a first end of the inductive element L1 and ground. The inductive element L1, resistive element R1, and switching element M1 is coupled in series between the voltage source 562 and ground.

In operation, at a phase φ1 of a control signal, the switching element M1 is turned OFF, allowing the voltage source 562 to charge the bypass capacitive element $C_{wf}$. Then, at another phase of the control signal, the switching element M1 is turned ON in order to deliver the charge formed on the capacitive element $C_{wf}$ to the load. The apparatus 560 may be operated to run any number of charge supply cycles in order to meet the current demand of the load.

FIG. 6 illustrates a block diagram of an exemplary communication device 600 in accordance with another aspect of the disclosure. The communication device 600 may be one exemplary implementation of a communication device that uses any of the apparatuses previously discussed as a voltage regulator. In particular, the communications device 600 comprises an antenna 602, a Tx/Rx isolation device 604, a low noise amplifier (LNA) 606, a pulse demodulator 608, a first voltage regulator 622, a receiver baseband processing module 610, a phase locked loop (PLL) and/or voltage controlled oscillator (VCO) 612, a reference oscillator 614, a transmitter baseband processing module 616, a pulse modulator 618, a second voltage regulator 624, and a power amplifier (PA) 620.

As a source communication device, data to be transmitted to a destination communication device is sent to the transmitter baseband processing module 616. The transmitter baseband processing module 616 processes the transmit data to generate an outbound baseband signal. The pulse modulator 618 generates pulses (e.g., ultra wideband (UWB) pulses) based on the outbound baseband signal. The second voltage regulator 624 supplies the charge at the proper time to the pulse modulator 618 in order for the pulse to be generated. The PA 620 amplifies the UWB pulses signal and provides it to the antenna 602 via the Tx/Rx isolation device 604 for transmission into a wireless medium. The transmit data may be generated by a sensor, a microprocessor, a microcontroller, a RISC processor, a keyboard, a pointing device such as a mouse or a track ball, an audio device, such as a headset, including a transducer such as a microphone, a medical device, a shoe, a robotic or mechanical device that generates data, a user interface, such as a touch-sensitive display, etc.

As a destination communication device, a received RF signal (e.g., inbound UWB pulses) is picked up by the antenna 602 and applied to the LNA 606 via the Tx/Rx isolation device 604. The LNA 604 amplifies the received RF signal. The pulse demodulator 608 generates an inbound baseband signal based on the received UWB pulses. The first voltage regulator 622 supplies the charge at the proper time to the pulse demodulator 608 in order to properly process the pulses. The receiver baseband processing 610 processes the incoming baseband signal to generate the received data. A data processor (not shown) may then perform one or more defined operations based on the received data. For example, the data processor may include a microprocessor, a microcontroller, a reduced instruction set computer (RISC) processor, a display, an audio device, such as a headset, including a transducer such as speakers, a medical device, a shoe, a watch, a robotic or mechanical device responsive to the data, a user interface, such as a display, one or more light emitting diodes (LED), etc.

Figure 7A:
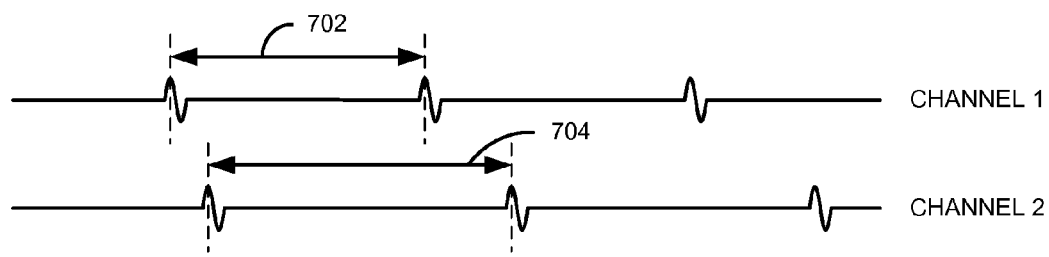
FIGS. 7A-D illustrate timing diagrams of various pulse modulation techniques in accordance with another aspect of the disclosure.

FIG. 7A illustrates different channels (channels 1 and 2) defined with different pulse repetition frequencies (PRF) as an example of a pulse modulation that may be employed in any of the communications systems, devices, and apparatuses described herein. Specifically, pulses for channel 1 have a pulse repetition frequency (PRF) corresponding to a pulse-to-pulse delay period 702. Conversely, pulses for channel 2 have a pulse repetition frequency (PRF) corresponding to a pulse-to-pulse delay period 704. This technique may thus be used to define pseudo-orthogonal channels with a relatively low likelihood of pulse collisions between the two channels. In particular, a low likelihood of pulse collisions may be achieved through the use of a low duty cycle for the pulses. For example, through appropriate selection of the pulse repetition frequencies (PRF), substantially all pulses for a given channel may be transmitted at different times than pulses for any other channel.

The pulse repetition frequency (PRF) defined for a given channel may depend on the data rate or rates supported by that channel. For example, a channel supporting very low data rates (e.g., on the order of a few kilobits per second or Kbps) may employ a corresponding low pulse repetition frequency (PRF)). Conversely, a channel supporting relatively high data rates (e.g., on the order of a several megabits per second or Mbps) may employ a correspondingly higher pulse repetition frequency (PRF).

Figure 7B:
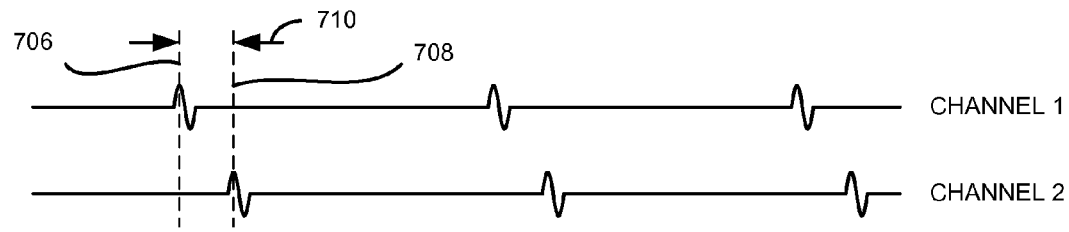

FIG. 7B illustrates different channels (channels 1 and 2) defined with different pulse positions or offsets as an example of a modulation that may be employed in any of the communications systems described herein. Pulses for channel 1 are generated at a point in time as represented by line 706 in accordance with a first pulse offset (e.g., with respect to a given point in time, not shown). Conversely, pulses for channel 2 are generated at a point in time as represented by line 708 in accordance with a second pulse offset. Given the pulse offset difference between the pulses (as represented by the arrows 710), this technique may be used to reduce the likelihood of pulse collisions between the two channels. Depending on any other signaling parameters that are defined for the channels (e.g., as discussed herein) and the precision of the timing between the devices (e.g., relative clock drift), the use of different pulse offsets may be used to provide orthogonal or pseudo-orthogonal channels.

Figure 7C:
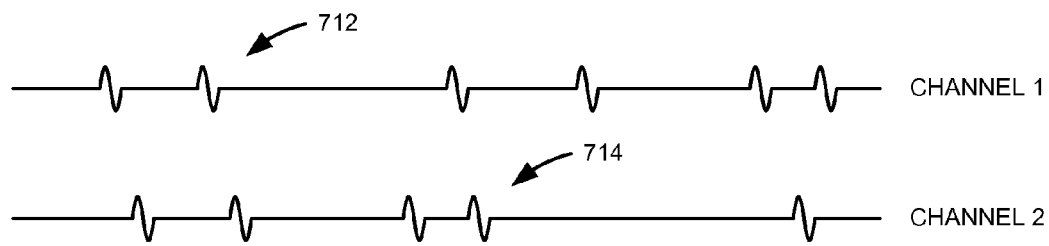

FIG. 7C illustrates different channels (channels 1 and 2) defined with different timing hopping sequences modulation that may be employed in any of the communications systems described herein. For example, pulses 712 for channel 1 may be generated at times in accordance with one time hopping sequence while pulses 714 for channel 2 may be generated at times in accordance with another time hopping sequence. Depending on the specific sequences used and the precision of the timing between the devices, this technique may be used to provide orthogonal or pseudo-orthogonal channels. For example, the time hopped pulse positions may not be periodic to reduce the possibility of repeat pulse collisions from neighboring channels.

Figure 7D:
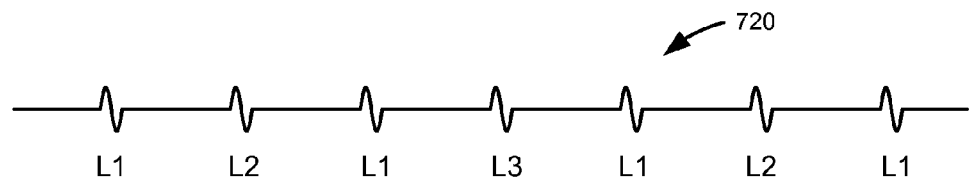

FIG. 7D illustrates different channels defined with different time slots as an example of a pulse modulation that may be employed in any of the communications systems described herein. Pulses for channel L1 are generated at particular time instances. Similarly, pulses for channel L2 are generated at other time instances. In the same manner, pulse for channel L3 are generated at still other time instances. Generally, the time instances pertaining to the different channels do not coincide or may be orthogonal to reduce or eliminate interference between the various channels.

It should be appreciated that other techniques may be used to define channels in accordance with a pulse modulation schemes. For example, a channel may be defined based on different spreading pseudo-random number sequences, or some other suitable parameter or parameters. Moreover, a channel may be defined based on a combination of two or more parameters.

FIG. 8 illustrates a block diagram of various ultra-wide band (UWB) communications devices communicating with each other via various channels in accordance with another aspect of the disclosure. For example, UWB device 1 802 is communicating with UWB device 2 804 via two concurrent UWB channels 1 and 2. UWB device 802 is communicating with UWB device 3 806 via a single channel 3. And, UWB device 3 806 is, in turn, communicating with UWB device 4 808 via a single channel 4. Other configurations are possible. The communications devices may be used for many different applications, and may be implemented, for example, in a headset, microphone, biometric sensor, heart rate monitor, pedometer, EKG device, watch, shoe, remote control, switch, tire pressure monitor, or other communications devices. A medical device may include smart band-aid, sensors, vital sign monitors, and others. The communications devices described herein may be used in any type of sensing application, such as for sensing automotive, athletic, and physiological (medical) responses.

Any of the above aspects of the disclosure may be implemented in many different devices. For example, in addition to medical applications as discussed above, the aspects of the disclosure may be applied to health and fitness applications. Additionally, the aspects of the disclosure may be implemented in shoes for different types of applications. There are other multitude of applications that may incorporate any aspect of the disclosure as described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. An apparatus for forming a predetermined current pulse through or a predetermined voltage pulse across a load, comprising:
   a battery coupled between a first node and ground;
   a regulator configured to regulate a continuous voltage across the load, wherein regulator comprises:
      a first switching device coupled between the first node and a second node;
      a first capacitive device coupled between the second node and ground;
      a second switching device coupled between the second node and a third node, wherein the continuous voltage is produced at the third node;
      a second capacitive device coupled between the third node and ground;
      a differential amplifier configured to generate a control signal based on a difference between the continuous voltage and a reference voltage; and a timing device configured to operate the first and second switching devices based on the control signal; and a charge-on-demand circuit configured to supply charge to the load simultaneously with the continuous voltage being applied across the load, the charge-on-demand circuit comprising:
- a plurality of sources to provide charge, wherein the charge sources respectively comprise capacitors or inductors;
- a plurality of switching elements adapted to couple the plurality of sources to the load, respectively; and
- a controller adapted to:
  - simultaneously maintain open all of the switching elements and control the charge sources to energize the respective capacitors or inductors prior to the formation of the predetermined current pulse or the predetermined voltage pulse; and
  - selectively close the switching elements to deliver the charge from the energized capacitors or inductors to the load during the formation of the predetermined current pulse or the predetermined voltage pulse.

2. The apparatus of claim 1, wherein the controller is adapted to control the charge provided to the load from each source based on variation of an ambient condition or a manufacturing process.

3. The apparatus of claim 1, wherein the controller is adapted to control the charge provided to the load from each source so that the continuous voltage comprises a defined voltage ripple.

4. The apparatus of claim 1, wherein the controller is adapted to control the charge provided to the load from each source to maintain the continuous voltage at or above a defined voltage level.

5. The apparatus of claim 1, wherein the regulator comprises a Buck converter or a switched capacitor converter.

6. The apparatus of claim 1, wherein the regulator is adapted to regulate the continuous voltage in a defined timing relationship with the charge provided to the load from each source.

7. The apparatus of claim 1, wherein at least one of the charge sources is configured as a capacitor-based feed forward network, a voltage boosted capacitor feed forward network, a switched inductor feed forward network, or a bypass capacitor feed forward network.

8. The apparatus of claim 1, wherein amounts of charge provided respectively by two or more charge sources are distinct.

9. The apparatus of claim 1, wherein amounts of charge provided respectively by two or more charge sources are substantially the same.

10. The apparatus of claim 1, wherein one or more voltages generated respectively in the charge sources are greater than the continuous voltage across the load.

11. A method for forming a predetermined current pulse through or a predetermined voltage pulse across a load, comprising:
- regulating a continuous voltage across the load by a voltage regulator, wherein the voltage regulator comprises:
  - a battery coupled between a first node and ground;
  - a first switching device coupled between the first node and a second node;
  - a first capacitive device coupled between the second node and ground;
  - a second switching device coupled between the second node and a third node, wherein the continuous voltage is produced at the third node;
  - a second capacitive device coupled between the third node and ground;
  - a differential amplifier configured to generate a control signal based on a difference between the continuous voltage and a reference voltage; and
  - a timing device configured to operate the first and second switching devices based on the control signal;
- providing charge to the load as needed by a charge-on-demand circuit simultaneously with the continuous voltage being applied across the load, wherein providing charge to the load comprises:
- energizing capacitors or inductors at respective nodes while simultaneously isolating the nodes from the load prior to the formation of the predetermined current pulse or the predetermined voltage pulse; and
- selectively closing switching elements coupled respectively between the distinct nodes and the load to deliver the charge from the energized capacitors or inductors to the load during the formation of the predetermined current pulse or the predetermined voltage pulse.

12. The method of claim 11, wherein selectively closing the switching elements is based on variation of an ambient condition or a manufacturing process.

13. The method of claim 11, wherein selectively closing the switching elements is such that the continuous voltage comprises a defined voltage ripple.

14. The method of claim 11, wherein selectively closing the switching elements is performed in a manner to maintain the continuous voltage at or above a defined voltage level.

15. The method of claim 11, wherein regulating the continuous voltage is performed in a defined timing relationship with the charge provided to the load from each node.

16. The method of claim 11, wherein amounts of charge provided respectively by two or more nodes are distinct.

17. The method of claim 11, wherein amounts of charge provided respectively by two or more nodes are substantially the same.

18. The method of claim 11, wherein a voltage at one or more nodes is greater than the continuous voltage across the load.

19. An apparatus for forming a predetermined current pulse through or a predetermined voltage pulse across a load, comprising:
- a battery coupled between a first node and ground;
- means for regulating a continuous voltage across the load, wherein the means for regulating comprises:
  - a switching device coupled between the first node and a second node;
  - a diode including a cathode and an anode coupled between the second node and ground;
  - a first inductive device coupled between the second anode and a third node;
  - a first capacitive device coupled between the third node and ground;
  - a second inductive device coupled between the third node and a fourth node, wherein the continuous voltage is produced at the fourth node;
  - a second capacitive device coupled between the fourth node and ground;
  - a differential amplifier configured to generate a control signal based on a difference between the continuous voltage and a reference voltage; and
  - a gated oscillator configured to control the switching of the switching device based on the control signal;
- means for supplying charge-on-demand to the load simultaneously with the continuous voltage being applied across the load, the means for supplying comprising:

a plurality of means for generating charge including respective means for energizing capacitors or inductors;

a plurality of means for selectively coupling the charge generating means to the load;

means for controlling the charge generating means and the coupling means to simultaneously energize the capacitors or inductors while isolating the capacitors or inductors from the load prior to the formation of the predetermined current pulse or the predetermined voltage pulse, and deliver charge from the energized capacitors or inductors to the load during the formation of the predetermined current pulse or the predetermined voltage pulse.

20. The apparatus of claim 19, wherein the controlling means is adapted to control the charge provided to the load from each charge generating means based on variation of an ambient condition or a manufacturing process.

21. The apparatus of claim 19, wherein the controlling means is adapted to control the charge provided to the load from each charge generating means so that the continuous voltage comprises a defined voltage ripple.

22. The apparatus of claim 19, wherein the controlling means is adapted to control the charge provided to the load from each charge generating means to maintain the continuous voltage at or above a defined voltage level.

23. The apparatus of claim 19, wherein the regulating means comprises a Buck converter or a switched capacitor converter.

24. The apparatus of claim 19, wherein the regulating means is adapted to regulate the continuous voltage in a defined timing relationship with the charge provided to the load from each charge generating means.

25. The apparatus of claim 19, wherein the charge generating means comprises a capacitor-based feed forward network, a voltage boosted capacitor feed forward network, a switched inductor feed forward network, or a bypass capacitor feed forward network.

26. The apparatus of claim 19, wherein amounts of charge provided respectively by two or more charge generating means are distinct.

27. The apparatus of claim 19, wherein amounts of charge provided respectively by two or more charge generating means are substantially the same.

28. The apparatus of claim 19, wherein a voltage generated in one or more of the charge generating means is greater than the continuous voltage across the load.

29. A computer program product for forming a predetermined current pulse through or a predetermined voltage pulse across a load, comprising a computer readable medium including instructions executable to:

regulate a continuous voltage across the load by a voltage regulator, wherein the voltage regulator comprises:
a battery coupled between a first node and ground;
a switching device coupled between the first node and a second node;
a diode including a cathode and an anode coupled between the second node and ground;
a first inductive device coupled between the second anode and a third node;
a first capacitive device coupled between the third node and ground;
a second inductive device coupled between the third node and a fourth node, wherein the continuous voltage is produced at the fourth node;
a second capacitive device coupled between the fourth node and ground;

a differential amplifier configured to generate a control signal based on a difference between the continuous voltage and a reference voltage; and
a gated oscillator configured to control the switching of the switching device based on the control signal;

providing charge to the load as needed by a charge-on-demand circuit simultaneously with the continuous voltage being applied across the load by:
energizing capacitors or inductors at respective nodes while simultaneously isolating the nodes from the load prior to the formation of the predetermined current pulse or the predetermined voltage pulse; and
closing switching elements to deliver the charge from the energized capacitors or inductors to the load during the formation of the predetermined current pulse or the predetermined voltage pulse.

30. A headset, comprising:
a transmitter adapted to transmit audio data;
a plurality of sources to provide charge, wherein the charge sources respectively comprise capacitors or inductors;
a plurality of switching elements adapted to couple the plurality of sources to the transmitter, respectively; and
a controller adapted to:
simultaneously maintain open all of the switching elements and control the charge sources to energize the respective capacitors or inductors prior to a formation of a predetermined current pulse or a predetermined voltage pulse for the transmitter;
selectively close the switching elements to deliver the charge from the energized capacitors or inductors to the transmitter during the formation of the predetermined current pulse or the predetermined voltage pulse.

31. A watch, comprising:
a receiver adapted to receive data;
a user interface adapted to generate an indication based on the received data;
a plurality of sources to provide charge, wherein the charge sources respectively comprise capacitors or inductors;
a plurality of switching elements adapted to couple the plurality of sources to the receiver, respectively; and
a controller adapted to:
simultaneously maintain open all of the switching elements and control the charge sources to energize the respective capacitors or inductors prior to a formation of the predetermined current pulse or a predetermined voltage pulse for the receiver;
selectively close the switching elements to deliver the charge from the energized capacitors or inductors to the receiver during the formation of the predetermined current pulse or the predetermined voltage pulse.

32. A sensing device, comprising:
a sensor adapted to generate sensed data;
a transmitter adapted to transmit the sensed data;
a plurality of sources to provide charge, wherein the charge sources respectively comprise capacitors or inductors;
a plurality of switching elements adapted to couple the plurality of sources to the transmitter, respectively; and
a controller adapted to:
simultaneously maintain open all of the switching elements and control the charge sources to energize the respective capacitors or inductors prior to a formation of a predetermined current pulse or a predetermined voltage pulse for the transmitter;
selectively close the switching elements to deliver the charge from the energized capacitors or inductors to the transmitter during the formation of the predetermined current pulse or the predetermined voltage pulse.

33. The apparatus of claim 1, wherein the predetermined current pulse through or the predetermined voltage pulse comprises an ultra wideband (UWB) pulse.

34. The apparatus of claim 1, wherein at least one of the charge sources is configured to produce a first voltage at a fourth node, wherein the corresponding one or more capacitors are arranged to form a second voltage from the first voltage, the second voltage being used to provide the charge to the load, and wherein the second voltage is substantially greater than the first voltage.

35. The apparatus of claim 34, wherein the at least one of the charge sources further comprises third, fourth, fifth, and sixth switching devices, and wherein the corresponding one or more capacitors include first and second capacitors; and
the first capacitor being coupled between a fifth node and ground, the third switching device being coupled between the fourth node and the fifth node, the fourth switching device being coupled between a sixth node and the fifth node, the fifth switching device being coupled between the sixth node and ground, the sixth switching device being coupled between the fourth node and a seventh node, and the second capacitor being coupled between the seventh node and the sixth node.

36. The apparatus of claim 35, wherein the controller is configured to:
close the third, fifth, and sixth switching devices and open the fourth switching device to form charge across the first and second capacitors, while the corresponding switching element is opened to electrically isolate the seventh node from the load; and
open the third, fifth, and sixth switching devices and close the fourth switching device and the corresponding switching element to form the second voltage at the seventh node and provide the charge from the seventh node to the load by way of the corresponding switching element.

37. The apparatus of claim 1, wherein at least one of the charge sources is configured to produce a voltage at a fourth node, and wherein the at least one of the charge sources further comprises:
a third switching device coupled between a fifth node and ground, wherein the corresponding inductor is coupled between the fourth and fifth nodes; and
a diode including an anode and a cathode coupled between the fifth node and the load.

38. The apparatus of claim 1, wherein at least one of the charge sources is configured to produce a voltage at a fourth node,
wherein the corresponding capacitor is coupled between the fourth node and ground, and wherein the corresponding inductor is coupled between the fourth node and a fifth node; and
wherein the at least one of the charge sources further comprises a resistor coupled between the fifth node and a sixth node, wherein the corresponding one of the switching elements is coupled between the sixth node and the load.

\* \* \* \* \*